United States Patent
Backes et al.

(10) Patent No.: US 9,889,829 B2
(45) Date of Patent: Feb. 13, 2018

(54) SYSTEMS AND METHODS FOR VEHICLE BRAKING CONTROL

(71) Applicant: Alstom Transport Technologies, Saint-Quen (FR)

(72) Inventors: Jess Austin Backes, Melbourne, FL (US); Tim Rolbiecki, Melbourne, FL (US); Michael Scott Mitchell, Lee's Summit, MO (US); Kelly Nichols, Melbourne, FL (US); Kristopher Smith, Melbourne, FL (US)

(73) Assignee: ALSTOM TRANSPORT TECHNOLOGIES, Saint-Quen (FR)

( * ) Notice: Subject to any disclaimer, the term of this patent is extended or adjusted under 35 U.S.C. 154(b) by 441 days.

(21) Appl. No.: 14/049,389

(22) Filed: Oct. 9, 2013

(65) Prior Publication Data

US 2014/0097667 A1    Apr. 10, 2014

Related U.S. Application Data

(60) Provisional application No. 61/712,256, filed on Oct. 10, 2012.

(51) Int. Cl.
*B60T 7/12* (2006.01)
*B60T 7/16* (2006.01)
*B60T 17/22* (2006.01)

(52) U.S. Cl.
CPC .............. *B60T 7/128* (2013.01); *B60T 7/16* (2013.01); *B60T 17/228* (2013.01)

(58) Field of Classification Search
CPC .......... B60T 7/128; B60T 7/16; B60T 17/228; B60T 13/662; B60T 13/665

USPC ......................... 303/20; 188/3 R; 701/19–20
See application file for complete search history.

(56) References Cited

U.S. PATENT DOCUMENTS

| | | | | |
|---|---|---|---|---|
| 3,374,035 A * | 3/1968 | Howard | .................. | B60T 15/16 303/16 |
| 5,145,239 A * | 9/1992 | Meise | ...................... | B60T 8/00 303/122 |
| 5,172,316 A * | 12/1992 | Root | ..................... | B60T 13/665 246/182 B |
| 5,393,129 A * | 2/1995 | Troiani | .................. | B60T 13/665 303/15 |
| 6,195,600 B1 * | 2/2001 | Kettle, Jr. | ................. | B60L 3/00 246/167 R |

(Continued)

*Primary Examiner* — Robert A. Siconolfi
*Assistant Examiner* — San Aung
(74) *Attorney, Agent, or Firm* — Christopher R. Carroll; The Small Patent Law Group, LLC

(57) ABSTRACT

A vehicle control system includes a brake system onboard a vehicle, a first actuation component, an automatic control system, and a second actuation component. The first actuation component is operably coupled to the brake system and is configured to cause actuation of the brake system to brake the vehicle when the first actuation component is activated. The automatic control system is onboard the vehicle and is configured to generate a first control signal for controlling the first actuation component to activate to upon occurrence of one or more designated conditions. The second actuation component is operably coupled to the brake system and is configured to cause actuation of the brake system to brake the vehicle upon receipt of one of the first control signal or a second control signal generated by the automatic control system.

3 Claims, 5 Drawing Sheets

(56) References Cited

U.S. PATENT DOCUMENTS

2002/0017439 A1* 2/2002 Hill .................. B60T 13/665
188/107
2008/0258547 A1* 10/2008 Ralea .................. B60T 8/1703
303/122

* cited by examiner

SYSTEMS AND METHODS FOR VEHICLE BRAKING CONTROL

CROSS-REFERENCE TO RELATED APPLICATIONS

This application claims priority to U.S. Provisional Application Ser. No. 61/712,256, which was filed on 10 Oct. 2012, and is titled "Systems And Method For Vehicle Braking Control," the entire disclosure of which is incorporated by reference.

FIELD

Embodiments of the subject matter described herein relate to vehicle braking systems. Other embodiments relate to control methods and systems for vehicle air brakes.

BACKGROUND

Some vehicles (e.g., certain rail vehicles) may be configured for automatic brake actuation upon the occurrence of designated conditions. For example, a vehicle may include an automatic control system that is configured to automatically control actuation of the vehicle's brakes when a designated signal is received from off-board the vehicle, when the vehicle exceeds a designated speed limit, when a designated on-board systems fails or other otherwise unable to function within designated parameters, etc. However, if an intermediate component of the vehicle (component between the automatic control system and the braking mechanism) fails, it may be the case that the vehicle brakes are not actuated even when they should. This may lead to potentially unsafe operating conditions, such as violating a traffic signal.

For example, some currently known automatic control systems communicate a single control signal to a computer controlled braking unit via a processing module. This presents a potential single-point failure that can prevent the computer controlled braking unit receiving the signal to apply brakes when requested by the automatic control system. For example, if the processing module fails, the braking unit may never be activated even when the automatic control system issues the control signal to cause activation of the braking unit.

A need exists for a vehicle braking control system that differs from systems currently available.

BRIEF DESCRIPTION

In an embodiment, a vehicle control system includes a brake system onboard a vehicle, a first actuation component, an automatic control system, and a second actuation component. The first actuation component is operably coupled to the brake system and is configured to cause actuation of the brake system to brake the vehicle when the first actuation component is activated. The automatic control system is onboard the vehicle and is configured to generate a first control signal for controlling the first actuation component to activate to upon occurrence of one or more designated conditions. The second actuation component is operably coupled to the brake system and is configured to cause actuation of the brake system to brake the vehicle upon receipt of one of the first control signal or a second control signal generated by the automatic control system.

In an embodiment, a vehicle system includes an air brake system onboard a vehicle, first and second brake actuation components, an automatic control system, and an intermediate control system. The first brake actuation component is operably coupled to the air brake system and is configured, when activated, to cause actuation of the air brake system to brake the vehicle. The second brake actuation component is operably coupled to the air brake system and is configured, when activated, to cause actuation of the air brake system to brake the vehicle. The automatic control system is onboard the vehicle and is configured, upon receipt of a designated off-board signal from off-board the vehicle, to generate a first control signal for controlling the first brake actuation component to activate. The intermediate control system is operably disposed between the automatic control system and the air brake system. The intermediate control system is configured to control activation of the first brake actuation component responsive to receiving the first control signal. The automatic control system is further configured to generate a second control signal for controlling the second brake actuation component to activate if the air brake system is not actuated to brake the vehicle within a designated time period from when the first control signal is generated.

In an embodiment, a method (e.g., for controlling a brake system of a vehicle) includes coupling a magnet valve to an air brake system of a vehicle that includes a first valve also coupled with the air brake system. Each of the magnet valve and the first valve is configured to be separately control to block or permit flow of air out of the air brake system to activate the air brake system. The method also includes connecting the magnet valve to an automatic control system of the vehicle. The automatic control system is configured to communicate one or more control signals to the first valve and the magnet valve to cause at least one of the first valve and the magnet valve to open and allow the air to flow out of the air brake system to activate the air brake system. The method further includes configuring the automatic control system to communicate a second control signal of the one or more control signals to the magnet valve responsive to the automatic control system previously communicating a first control signal of the one or more control signals to the first valve and the air brake system not being activated. The second control signal is communicated to the magnet valve to open the magnet valve and activate the air brake system.

BRIEF DESCRIPTION OF THE DRAWINGS

The subject matter described herein will be better understood from reading the following description of non-limiting embodiments, with reference to the attached drawings, wherein below.

DETAILED DESCRIPTION

Embodiments of the invention relate to a vehicle system, e.g., a system for vehicle braking control of a rail vehicle or other vehicle. The vehicle system comprises an air brake system onboard the vehicle, and first and second brake actuation components operably coupled to the air brake system. The brake actuation components are configured, when either is activated, to cause actuation of the air brake system to brake the vehicle. The vehicle system further comprises an automatic control system onboard the vehicle that is configured, upon the occurrence of one or more designated conditions, to generate a first control signal for controlling the first brake actuation component to activate. The second brake actuation component is configured to activate to cause actuation of the air brake system to brake the vehicle upon receipt of the first control signal generated by the automatic control system, or, in other embodiments, upon receipt of a second control signal generated by the automatic control system. Thus, according to an aspect of the invention, the second brake actuation component acts as a braking assurance mechanism, such that if the vehicle is not braked subsequent to the automatic control system generating the first control signal for controlling the first brake actuation component to activate, the vehicle is braked due to activation of the second brake actuation component. At least one technical effect of the inventive subject matter described herein is increasing the reliability of a brake system of a vehicle to activate when one or more components used to activate the brake system fail.

Figure 1:
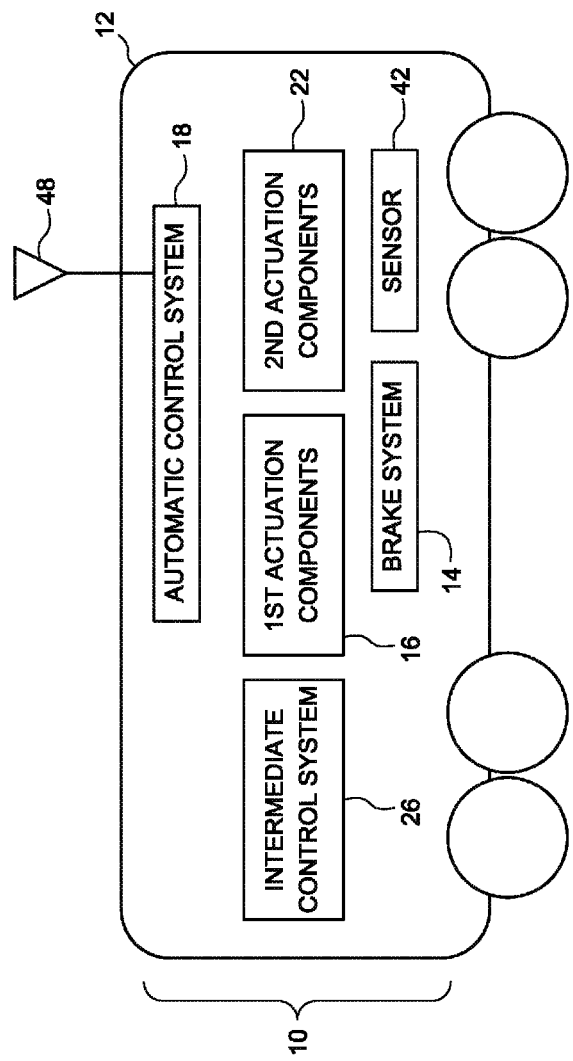
FIG. 1 is a schematic diagram of an embodiment of a vehicle control system.

FIG. 1 is a schematic diagram of an embodiment of a vehicle control system 10. The vehicle control system 10 is at least partially disposed onboard a vehicle 12, such as a rail vehicle. Optionally, the vehicle 12 may represent a series of vehicle mechanically connected with each other to travel together along a route, such as a consist, train, or the like. Alternatively, the vehicle 12 may represent another type of vehicle such as another off-highway vehicle (e.g., a vehicle that is not designed or permitted for travel on public roads), an automobile, a marine vessel, airplane, or the like.

The vehicle system 10 comprises a brake system 14 (e.g., an air brake system) onboard the vehicle 12. In one aspect, the brake system 14 can be activated by a first and/or second actuation component 16, 22 to slow or stop movement of the vehicle 12. For example, the first and/or second actuation component 16, 22 can be actuated to cause fluid pressure (e.g., air pressure) in the brake system 14 to be decreased by exhausting fluid (e.g., air) from the brake system 14. When the fluid pressure in the brake system 14 drops by a sufficient amount, the brake system 14 engages one or more moving components of the vehicle 12 (e.g., wheels, axles, or the like) to slow or stop movement of the vehicle 12. In another example, the brake system 14 may be another type of braking system, such as a dynamic braking system. The first and/or second actuation component 16, 22 may be activated to cause the dynamic braking system to slow or stop movement of the vehicle 12. While the description herein focuses on the brake system 14 being an air brake system, one or more embodiments described herein may encompass a brake system other than an air brake system.

The first and/or second actuation component 16, 22 can be activated to actuate the brake system 14 manually and/or by an automatic control system 18. For example, a human operator can manually actuate a lever, throttle, button, pedal, or the like, as the first and/or second actuation component 16, 22 to activate the brake system 14. The automatic control system 18 can represent one or more tangible and non-transitory computer devices (e.g., one or more processors, controllers, or the like, that are hard wired to perform operations described herein and/or operate using one or more sets of instructions such as software to perform operations described herein). The automatic control system 18 can automatically activate the brake system 14, such as by engaging the brake system 14 without requiring operator intervention. The automatic control system 18 may automatically activate the brake system 14 when one or more rules or criteria are met, such as when the speed of the vehicle 12 exceeds a designated limit, when the vehicle 12 enters a geographic location (e.g., a rail yard, location where the route is being repaired, a location where another vehicle is located, or the like), when an off-board signal is wirelessly received by an antenna and/or associated transceiver circuitry 48, when a signal is received via the route being traveled upon (e.g., through a rail), or the like.

In one aspect, the automatic control system 18 generates a command signal that is communicated to an intermediate control system 26, which can include or represent a processing module (e.g., vehicle control module), a computer controlled braking unit, or the like. The intermediate control system 26 may then actuate one or more of the first and/or second actuation components 16, 22. A sensor 42 can monitor one or more characteristics of the vehicle 12 and/or brake system 14. For example, the sensor 42 may measure a fluid pressure in the brake system 14 to determine if and/or when the brake system 14 has been activated (e.g., when the fluid pressure decreases). The sensor 42 can generate data that is communicated to or otherwise obtained by the automatic control system 18 to monitor the brake system 14.

Figure 2:
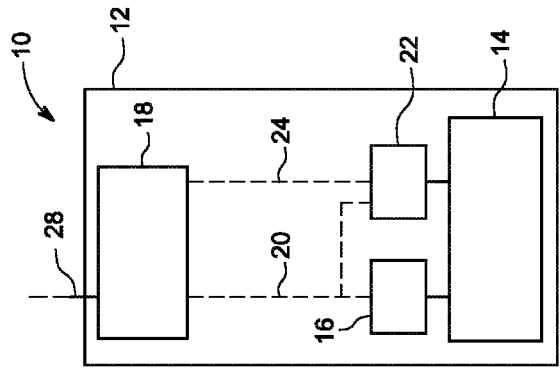
FIG. 2 is a schematic diagram of an embodiment of the vehicle control system shown in FIG. 1.

FIG. 2 is a schematic diagram of an embodiment of the vehicle control system 10 shown in FIG. 1. The first brake actuation component 16 is operably coupled to the brake system 14 such that, when activated, the first brake actuation component 16 causes actuation of the brake system 14 to brake the vehicle 12. As described above, the automatic control system 18 is configured, upon the occurrence of one or more designated conditions, to generate a first control signal 20 for controlling the first brake actuation component 16 to activate.

Figure 3:
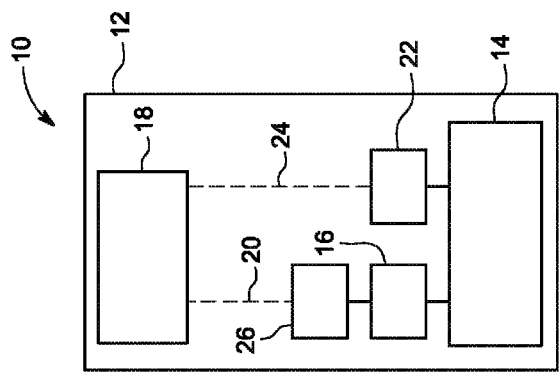
FIG. 3 is a schematic diagram of another embodiment of the vehicle control system shown in FIG. 1.

With continued reference to the embodiment of the vehicle control system 10 shown in FIG. 2, FIG. 3 is a schematic diagram of another embodiment of the vehicle control system 10 shown in FIG. 1. In the illustrated embodiment, the vehicle control system 10 also includes the intermediate control system 26 described above. The intermediate control system 26 is operably disposed between the automatic control system 18 and the brake system 14 such that the intermediate control system 26 may communicate with both the automatic control system 18 and the brake system 14.

The intermediate control system 26 is configured to control activation of the first brake actuation component 16 responsive to receiving the first control signal 20 generated by the automatic control system 18. As described above, the automatic control system 18 may automatically generate the first control signal 20 when an off-board signal is received, a rule or criteria is met, or the like. In this embodiment, the automatic control system 18 may not directly communicate with the brake system 14. Instead, the intermediate control system 26 (which is separate and distinct from the automatic control system 18) acts as an intermediary or "middle man" between the automatic control system 18 and the brake system 14. The intermediate control system 26 may alter the first control signal 20 received from the automatic control system 18. For example, the intermediate control system 26 may change the format, syntax, contents, or the like, of the first control signal 20 before sending the altered signal to the brake system 14 in order to activate the brake system 14.

In one aspect, the first control signal 20 is wirelessly communicated from the automatic control system 18 to both the first and second actuation components 16, 22. Optionally, the first control signal 20 may be communicated from the automatic control system 18 to each of the first and second actuation components 16, 22 over different communication media. For example, the first control signal 20 may be wirelessly communicated to one of the first or second actuation component 16 or 22 while the first control signal 20 is communicated to the other of the first or second actuation component 16 or 22 over one or more wired connections (e.g., conductive buses, cables, wires, multiple unit cable, or the like). Communicating the first control signal 20 to the components 16, 22 over different media can increase the possibility of the first control signal 20 being received by at least one of the first or second actuation components 16, 22. For example, if the wireless communication of the first control signal 20 is interrupted or prevented due to wireless interference, then the wired communication of the first control signal 20 may still be successful so that the brake system 14 is activated. As another example, if the wired communication of the first control signal 20 is interrupted or prevented (e.g., due to a break or damage to one or more of the conductive pathways over which the first control signal 20 is communicated), then the wireless communication of the first control signal 20 may still be successful so that the brake system 14 is activated.

In one aspect, both the first and second actuation components 16, 22 are electronic devices. For example, the first and second actuation components 16, 22 may be powered by direct and/or alternating electric current, and/or may be controlled by the receipt of electronic signals. Neither the first actuation component 16 nor the second actuation component 22 may be a pneumatically controlled or powered device. Optionally, at least one of the first and/or second actuation components 16, 22 may be a pneumatic device (e.g., pneumatically controlled and/or powered). Alternatively, one of the first or second actuation component 16 or 22 is an electronic device (e.g., electronically controlled and/or powered) while the other of the first or second actuation component 16 or 22 is not an electronic device (e.g., not electronically controlled or powered), such as a pneumatic device. One example of such an electronic device includes a magnetic valve that opens when energized by electric current or another valve that opens upon receipt of an electronic signal.

The second brake actuation component 22 also is operably coupled to the brake system 14 and is configured to activate to cause actuation of the brake system 14 to brake the vehicle 12 upon receipt of the first control signal 20 generated by the automatic control system 18. For example, the automatic control system 18 may communicate the same control signal 20 to both the first and second brake actuation components 16, 22 to increase the likelihood that at least one of these components 16, 22 successfully receives the control signal 20. When at least one of the components 16, 22 receives the control signal 20, the component(s) 16, 22 activate the brake system 14.

In one aspect, the second brake actuation component 22 is configured to activate the brake system 14 upon receipt of a second control signal 24. The second control signal 24 may be a signal generated by the automatic control system 18 to cause activation of the brake system 14. In one embodiment, the second control signal 24 is an electric signal, such as a signal conveyed using direct and/or alternating electric current. Alternatively, the second control signal 24 may be a pneumatic signal, such as a signal communicated by changing a fluid pressure in a conduit (e.g., a brake pipe).

The automatic control system 18 can send the second control signal 24 responsive to the first actuation component 16 and/or the intermediate control system 26 (which can activate the first actuation component 16) being in a failure state. A failure state of the first actuation component 16 and/or the intermediate control system 26 refers to the first actuation component 16 and/or the intermediate control system 26 being completely inoperative and/or not operating within designated parameters, such as by the first actuation component 16 and/or the intermediate control system 26 not activating the brake system 14 responsive to the automatic control system 18 communicating the first control signal 20 to the first actuation component 16 and/or the intermediate control system 26.

In the event of such a failure state, the automatic control system 18 can generate the second control signal 24 if the brake system 14 is not actuated to brake the vehicle 12. For example, following the communication of the first control signal 20 to the first actuation component 16, the automatic control system 18 may monitor data obtained by the sensor 42 to determine if the brake system 14 was activated responsive to the first control signal 20 being communicated. The non-activation of the brake system 14 can indicate that the first actuation component 16 and/or the intermediate control system 26 are in a failure state.

The automatic control system 18 may examine fluid pressures measured by a fluid pressure sensor 42 of the brake system 14 to determine if the fluid pressure in the brake system 14 dropped by a sufficient amount (e.g., at least a designated, non-zero amount within a designated, non-zero time period). If the fluid pressures measured by the sensor 42 do sufficiently decrease, then the measured fluid pressures may be indicative of the brake system 14 being activated to stop movement of the vehicle 12. This pressure drop also may indicate that the intermediate control system 26 and/or first actuation component 16 are in an operative state (e.g., not in the failure state). As a result, the automatic control system 18 may not send any additional control signals 20, 24 in order to activate the brake system 14 at that time.

Conversely, if the fluid pressures do not sufficiently decrease, then the measured fluid pressures may indicate that the brake system 14 was not activated. This absence of a pressure drop also may indicate that the intermediate control system 26 and/or the first actuation component 16 are in a failure state. In response, the automatic control system 14 may send one or more additional control signals 20, 24 to ensure that the brake system 14 is activated. For example, the automatic control system 18 may send the first control signal 20 again to the first actuation component 16, the automatic control system 18 may send the first control signal 20 to the second actuation component 22, and/or the automatic control system 18 may send the second control signal 24 to the second actuation component 22 in order to activate the brake system 14. The automatic control system 18 may delay generation and/or communication of the second control signal 24 for at least a designated, non-zero time period following communication of the first control signal 20 in order to allow sufficient time for the brake system 14 to activate responsive to communication of the first control signal 20.

Figure 4:
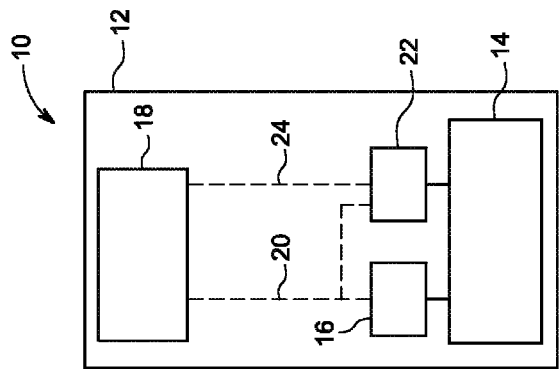
FIG. 4 illustrates another embodiment of the vehicle control system.

FIG. 4 illustrates another embodiment of the vehicle control system 10. As described above, the automatic control system 18 may generate the first control signal 20 responsive to receiving a designated off-board signal 28 from a location disposed off of the vehicle 12. For example, a device located off-board the vehicle 12, such as a remotely located operator handheld remote control, may wirelessly communicate the off-board signal 28 to the automatic control system 18 via the antenna and associated transceiver circuitry 48 (shown in FIG. 1). The automatic control system 18 may then generate and communicate the first control signal 20 to the first and/or second actuation component 16, 22. As another example, the off-board signal 28 may be communicated through one or more rails along the route being traveled by the vehicle 12 and detected by the automatic control system 18 via one or more pickup devices conductively and/or inductively coupled with the one or more rails. Such a signal 28 may be a positive train control (PTC) signal or another signal. Optionally, another signal may be communicated from a source disposed off-board the vehicle 12 (and/or a train, consist, or the like, that includes the vehicle 12) as the off-board signal 48.

Figure 5:
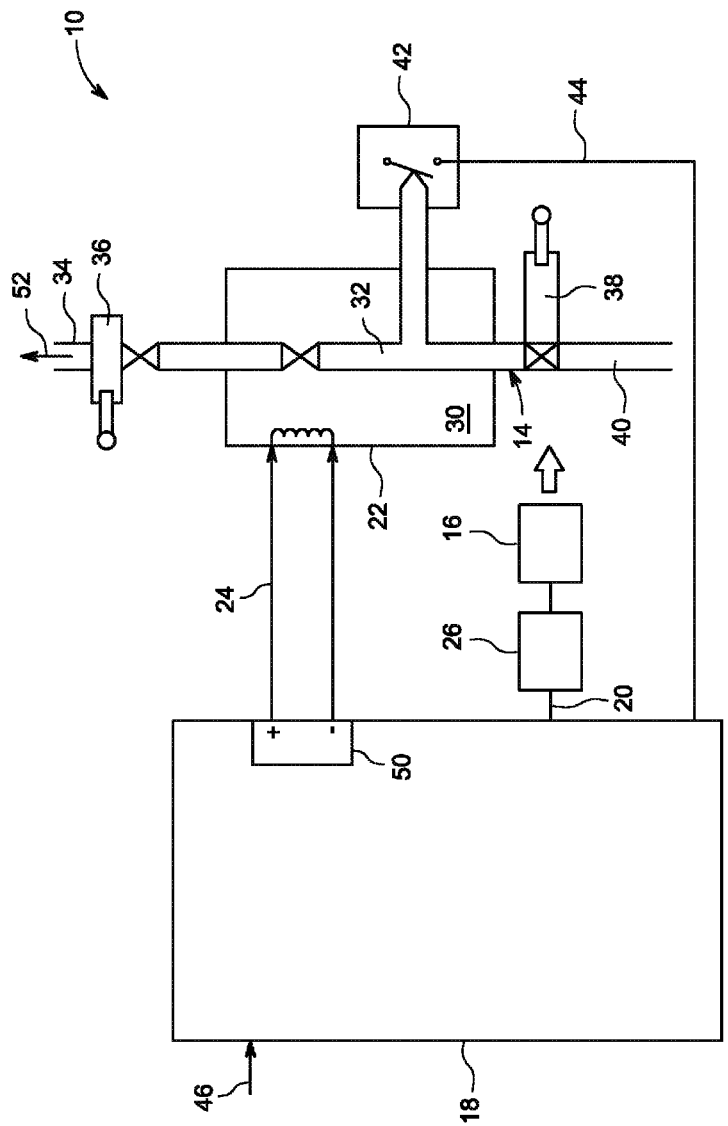
FIG. 5 is a schematic diagram of another embodiment of the vehicle control system.

FIG. 5 is a schematic diagram of another embodiment of the vehicle control system 10. In the illustrated embodiment, the second brake actuation component 22 includes or represents an electrically activated valve 30 operably coupled to a brake pipe 32 of the brake system 14. For example, the valve 30 may be a magnet valve that is opened or closed by application, removal, or change of an electric charge. Optionally, the valve 30 can represent another type of valve or device, such as a gate, a pneumatically controlled valve, or the like.

The automatic control system 18 includes or is coupled with a power source 50, such as a battery, capacitor, flywheel, generator, alternator, or the like. The power source 50 is at least one of conductively and/or inductively coupled with the valve 30. The automatic control system 18 can control the application of electric energy (e.g., electric current) to the valve 30 from the power source 50 as the first and/or second control signals 20, 24. For example, the automatic control system 18 may direct the power source 50 to apply at least a threshold voltage to the valve 30 in order to activate (e.g., open) the valve 30 as the second control signal 24. Conversely, the automatic control system 18 may direct the power source 50 to stop supplying electric current to the valve 30 in order to activate (e.g., open) the valve 30 as the second control signal 24.

The brake pipe 32 represents a conduit through which fluid of the brake system 14 flows. For example, air may flow through the brake pipe 32 to increase or decrease the fluid pressure in the brake system 14. The electrically activated valve 30 is operably coupled to a first exhaust 34 fluidly coupled with the brake pipe 32. The first exhaust 34 provides an exit for fluid in the brake system 14 to flow out of the brake system 14 in order to decrease the fluid pressure of the brake system 14 (and thereby activate the brake system 14).

When the electrically activated valve 30 is activated upon receipt of the first control signal 20 or the second control signal 24 (as applicable), the valve 30 opens so that the exhaust 34 and the brake pipe 32 are fluidly coupled with each other. The fluid in the brake pipe 32 may then leave the brake system 14 via the exhaust 34. The departure of the fluid from the brake system 14 causes the fluid pressure in the brake system 14 to decrease, thereby causing the brake system 14 to engage the vehicle 12 and slow or stop movement of the vehicle 12.

As described above, the automatic control system 18 may monitor the brake system 14 in order to determine if communication of the first and/or second control signal 20, 24 was successful in activating the brake system 14. A determination of whether the brake system 14 was actuated may be based on a feedback signal 46 received by the automatic control system 18 and generated by the sensor 42. For example, the feedback signal 46 can represent or indicate the fluid pressure in the brake pipe 32 and/or brake system 14 as measured by the sensor 42. Additionally or alternatively, this feedback signal 46 may be generated by another control system in the vehicle 12 or another component.

In the illustrated embodiment of the vehicle control system 10, the system 10 includes an isolation cock or isolation valve 36 coupled with the brake pipe 32 between the electrically activated valve 30 and the first exhaust 34. The isolation cock 36 may include or represent one or more types of valves, such as a stopcock, a double check valve, or the like. The isolation cock 36 can be a pneumatic valve as opposed to an electrically controlled or powered valve. Alternatively, the isolation cock 36 may be an electric valve. The isolation cock 36 can be installed (e.g., added to a pre-existing brake system 14) in the brake pipe 32 (e.g., emergency brake pipe) between the electrically activated valve 30 and the exhaust 34 of the electrically activated valve 30. The isolation cock 36 can allow for isolation of the automatic control system 18 in the event that the automatic control system 18 fails.

For example, the isolation cock 36 is moveable between two or more positions to allow or prevent flow of the fluid in the brake system 14 through the brake pipe 32 and out of the exhaust 34 through an open end 52 of the exhaust 34. In a first position of the isolation cock 36, the isolation cock 36 blocks a fluid connection between the electrically activated valve 30 and the first exhaust 34 to prevent the fluid in the brake system 14 from escaping through the exhaust 34. If the isolation cock 36 is in the first position when the valve 30 is activated (e.g., to be opened), the isolation cock 36 prevents a reduction in the pressure level in the brake pipe 32. As a result, the fluid pressure in the brake system 14 may not decrease even when the first and/or second control signal 20, 24 is received by the valve 30 and the valve 30 opens in response thereto.

In a different, second position of the isolation cock 36, the isolation cock 36 opens to enable the fluid connection between the brake pipe 32 and the exhaust 34. If the isolation cock 36 is in the second position when the valve 30 is activated (e.g., to be opened), the isolation cock 36 permits fluid in the brake pipe 32 to flow to and exit out of the exhaust 34. Consequently, the fluid pressure in the brake pipe 32 decreases to activate the brake system 14.

The isolation cock 36 may be provided to selectively isolate the automatic control system 18 in event of a failure thereof. The automatic control system 18 can be in a failure state when the automatic control system 18 is not able to communicate the first and/or second control signals 20, 24, is not able to communicate the first and/or second control signals 20, 24 at the correct times (e.g., when one or more designated rules or criteria are met), when the off-board signal 48 is communicated or received, or the like. In such a failure state, the isolation cock 36 may be manually controlled (e.g., moved) by an onboard operator between the first and second positions to manually activate or deactivate the brake system 14. Optionally, the isolation cock 36 may be automatically controlled by a system other than the automatic control system 14.

The vehicle control system 10 may include a manual valve 38 operably coupled to the brake pipe 32 of the brake system 14. The manual valve 38 may be included in addition to or in place of the isolation cock 36. The manual valve 38 is fluidly coupled with the brake pipe 32 and a second exhaust 40 of the brake system 14. The manual valve 38 can be manually moved between first and second positions to allow or prevent the fluid in the brake pipe 32 from exiting via the second exhaust 40. For example, in a first position, the manual valve 38 is closed such that the fluid in the brake pipe 32 cannot flow through the valve 38 and out of the brake system 14 via the exhaust 40. In a different, second position, the manual valve 38 is at least partially open such that the fluid in the brake pipe 32 can flow through the valve 38 and out of the brake system 14 via the exhaust 40. As described above, this can cause the brake system 14 to be activated. The manual valve 38 can be moved between the positions in order to manually activate the brake system 14, such as in an emergency situation and/or where one or more of the automatic control system 18, the intermediate control system 26, the first actuation component 16, the second actuation component 22, the valve 30, and/or the isolation cock 36 is in a failure state (e.g., not operative). For example, the brake pipe 32 may be an emergency brake pipe, and the manual valve 38 may be an emergency brake handle-actuated valve.

In one aspect, the isolation cock 36 is not activated (e.g., opened) if the manual valve 38 is opened. The isolation cock 36 may be locked in position when the manual valve 38 is opened to prevent the fluid pressure in the brake system 14 from venting via the isolation cock 36 instead of through the manual valve 38.

As described above, the vehicle control system 10 can include the sensor 42 to measure the fluid pressure in the brake system 14. The sensor 42 can include or represent a pressure switch, a pressure gauge, or the like, that is fluidly coupled to the brake pipe 32 of the brake system 14 and operably coupled to the automatic control system 18. The sensor 42 generates an output signal 44 representative of the fluid pressure in the brake pipe 32 and/or brake system 14. The automatic control system 18 can determine if one or more components of the vehicle control system 10 is operational or in a failure state using the output signal 44. For example, the automatic control system 18 can examine the fluid pressures in the brake system 14 following communication of the first control signal 20 to determine if one or more of these components are in a failure state. If the fluid pressures do not indicate an activation of the brake system 14, the automatic control system 18 can identify a failure in the control system 10. The automatic control system 18 may then communicate the first control signal 20 again, communicate the second control signal 24, and/or direct an operator to manually actuate the brake system 14, as described above. The sensor 42 can provide the automatic control system 18 with a way of verifying expected or correct operation of the brake system 14 during a test, such as a departure test that is performed prior to the vehicle 12 beginning movement.

In one or more embodiments described herein, the vehicle 12 is a locomotive or other rail vehicle, and the brake system 14 is a rail vehicle air brake system, such as an emergency air brake system. In such systems, the brake pipe 32 is maintained at or above a first pressure level for the braking function to be inactive. If the pressure level falls to a second pressure level that is lower than the first pressure level, the brake function is activated for braking the rail vehicle. Each of the brake actuation components 16, 22 may be a brake valve that can be opened to allow pressure in the brake system 14 to exhaust out of the brake system 14. Further, the automatic control system 18 may be a rail vehicle safety system, such as automatic train control (ATC) or PTC unit, which receives signals 28 from off-board, wirelessly or through cab signaling (receipt of signals over track).

Figure 6:
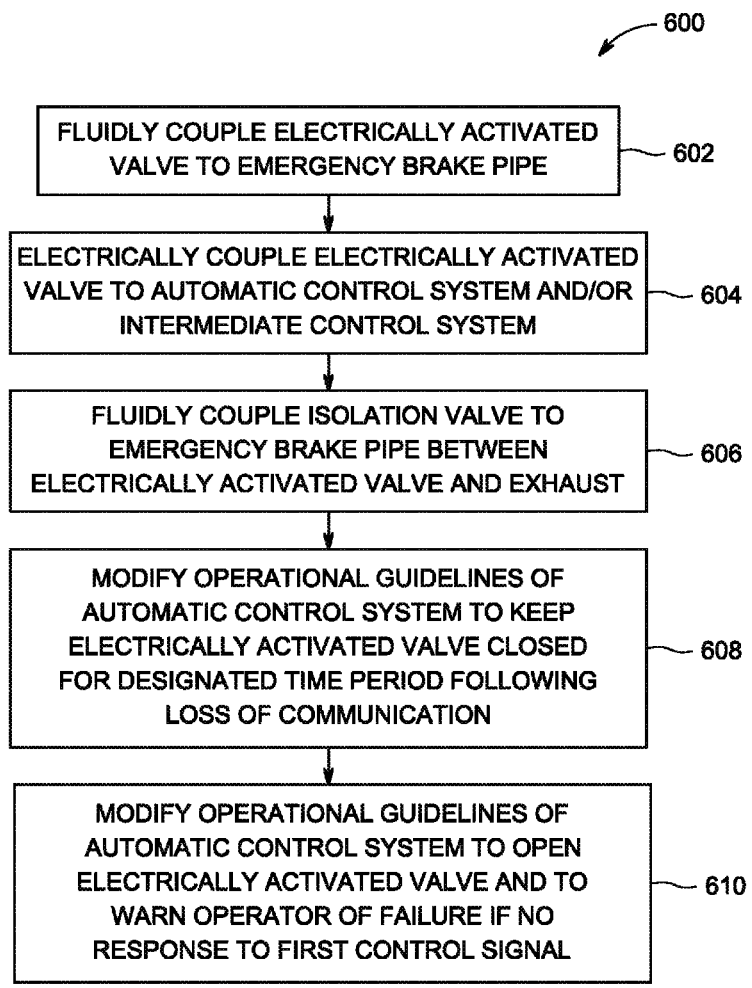
FIG. 6 illustrates a flowchart of an embodiment of a method for establishing a vehicle control system that controls operations of a brake system.

FIG. 6 illustrates a flowchart of an embodiment of a method 600 for establishing a vehicle control system that controls operations of a brake system. The method 600 may be used to construct the control system 10 described above, such as by retrofitting an existing vehicle 12 with additional components to form the control system 10.

At 602, an electrically activated valve is fluidly coupled to a brake pipe of a brake system. For example, the magnet valve 30 may be fluidly coupled to the brake pipe 32. The magnet valve 30 may be positioned along the brake pipe 32 to control whether fluid in the brake pipe 32 can exit the brake pipe 32 through the exhaust 34. The magnet valve 30 may be closed when energized (e.g., when a voltage or alternating current is applied to the valve 30) and opened when de-energized (e.g., when no voltage or alternating current, or voltage or alternating current that is less than an activation threshold, is applied to the valve 30). Alternatively, the magnet valve 30 may be open when energized and closed when de-energized.

At 604, the electrically activated valve is electrically coupled with an automatic control system and/or an intermediate control system. For example, the valve 30 may be conductively and/or inductively connected with the power source 50 controlled by the automatic control system 18 and/or intermediate control system 26. The automatic control system 18 and/or intermediate control system 26 can control when electric energy (e.g., direct and/or alternating current) is supplied to the valve 30 in order to control whether the valve 30 is open or closed.

At 606, an isolation valve is fluidly coupled to the brake pipe between the electrically activated valve and an exhaust. For example, a pneumatically or manually controlled valve such as the isolation cock 36 may be fluidly coupled with the brake pipe 32 between the magnet valve 30 and the exhaust 34. The isolation cock 34 can be controlled without application of an electric current to the isolation cock 34 in order to open or close the isolation cock 34 in one embodiment.

At 608, one or more operational guidelines of the automatic control system are modified (e.g., created, altered from previously designated guidelines, or the like). The operational guidelines can include rules, criteria, or the like, that direct operations of the automatic control system 18. In one embodiment, these operational guidelines are sets of instructions stored on tangible and non-transitory computer readable storage medium, such as software stored on a computer hard drive or other memory device. Additionally or alternatively, the operational guidelines are sets of instructions that are hard wired into the logic of the automatic control system 18, such as by being hard wired into the processors of the system 18.

The operational guidelines of the automatic control system 18 can be modified and/or operational guidelines of the intermediate control system 26 can be established so that the brake system 14 is prevented from being applied if the automatic control system 18 enters a failure state. For example, if the automatic control system 18 enters the failure state, the brake system 14 may be prevented from being automatically applied responsive to this failure state by the intermediate control system 26 keeping the electrically controlled valve 30 closed for at least a designated, non-zero time period. Keeping this valve 30 closed following the automatic control system 18 entering the failure state can prevent the brake system 14 from needlessly being applied. Following this designated time period, the brake system 14 may be activated. If a condition still exists or arises that requires application of the brake system 14 (e.g., the off-board signal directs the brake system 14 to be applied), then the intermediate control system 26 may open the valve 30 following expiration of the time period. As another example, if the automatic control system 18 enters the failure state, and the automatic control system 18 is unable to communicate with the intermediate control system 26, then the automatic control system 18 may keep the valve 30 closed unless and until a condition arises that causes or requires the automatic control system 18 to activate the brake system 14.

At 610, operational guidelines of the automatic control system 18 may be modified and/or created to cause the electrically controlled valve to be opened and/or to generate a warning to the operator of the vehicle 12 if communication of the first control signal 20 does not result in the brake system 14 being activated. For example, following communication of the first control signal 20 to the first actuation component 16 and/or the intermediate control system 26, if the measured pressures of the brake system 14 do not indicate that the brake system 14 has been activated, then the automatic control system 16 may direct an output device (e.g., a monitor, display, speaker, or the like) to generate an alarm or alert to notify the operator of the vehicle 12 of a potential failure state of the braking system 14. The automatic control system 18 additionally or alternatively may communicate the second control signal to the electrically controlled valve 30 (e.g., the second actuation component 22 in order to open the valve 30 (and thereby activate the brake system 14).

Figure 7:
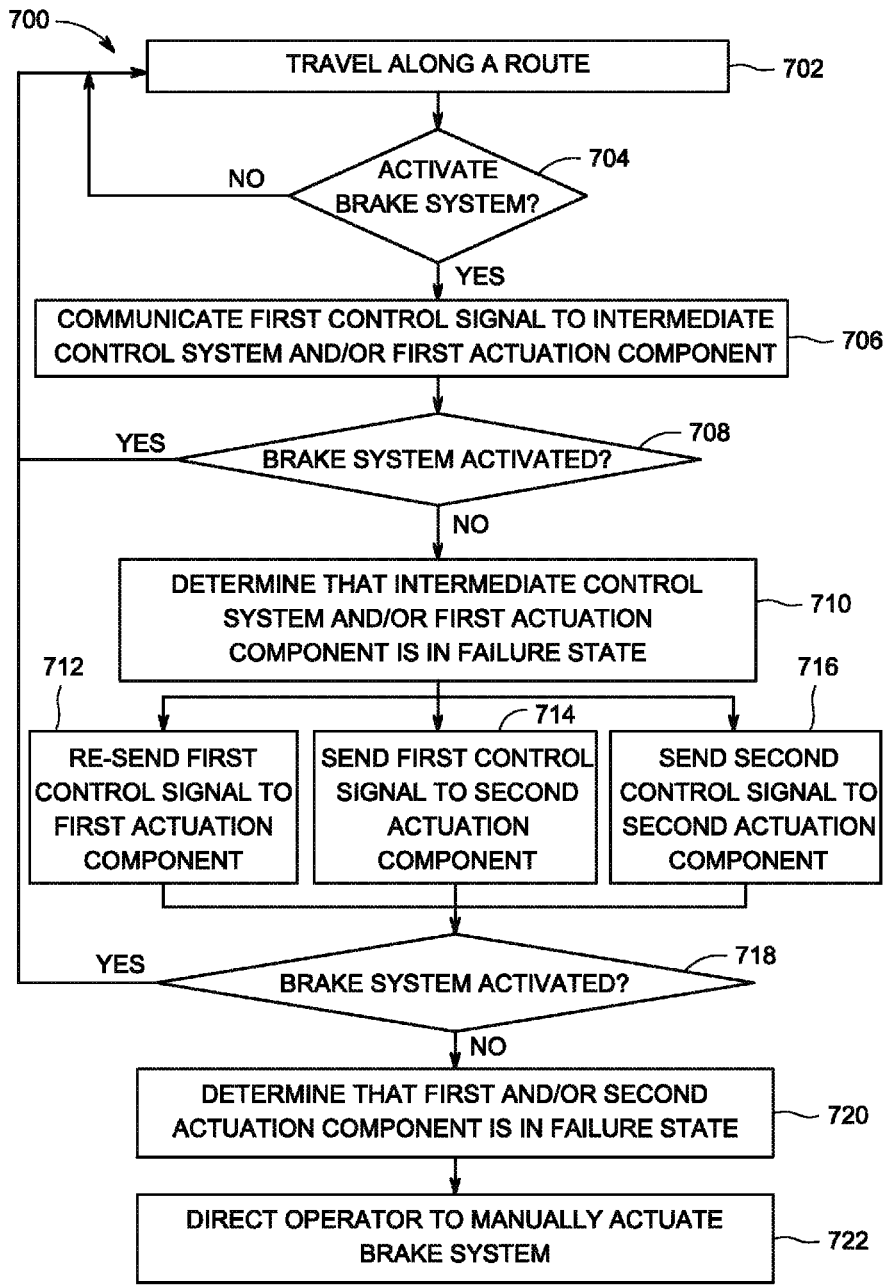
FIG. 7 illustrates a flowchart of an embodiment of a method for controlling a vehicle.

FIG. 7 illustrates a flowchart of an embodiment of a method 700 for controlling a vehicle. The method 700 may be used to automatically control activation of the brake system 14 of the vehicle 12. At 702, the vehicle 12 travels along a route, such as a rail formed from one or more tracks. At 704, a determination is made as to whether the brake system 14 of the vehicle 12 is to be activated to slow or stop movement of the vehicle 12. For example, a determination may be made as to whether an off-board signal is received directing the brake system 14 to be activated and/or if an emergency situation has arisen which requires application of the brake system 14. If the brake system 14 is to be activated, then flow of the method 700 may proceed to 706. Otherwise, flow of the method 700 may return to 702 so that the vehicle 702 may continue to travel along the route.

At 706, the first control signal 20 is communicated to the intermediate control system 26 and/or the first actuation component 16. The first control signal 20 is communicated to cause the intermediate control system 26 to activate the first actuation component 16 (e.g., electronically direct the component 16 to open a valve) and cause fluid pressure in the brake system 14 to exhaust out of the brake system 14. The first control signal 20 may additionally or alternatively be communicated to the first actuation component 16 (e.g., from the intermediate control system 26 or directly from the automatic control system 18) to activate the first actuation component 16 and cause the brake system 14 to exhaust.

At 708, a determination is made as to whether the brake system 14 was activated responsive to communication of the first control signal 20. For example, if the fluid pressure in the brake system 14 decreases by at least a designated, non-zero threshold amount within a designated, non-zero time period following communication of the first control signal 20, then the brake system 14 was activated in response to the first control signal 20. As a result, flow of the method 700 may return to 702. If the fluid pressure does not decrease, then communication of the first control signal 20 may have been unsuccessful in activating the brake system 14. For example, one or more components of the vehicle control system 10 may be in a failure state and unable to perform one or more operations to directly or indirectly cause the brake system 14 to activate. As a result, flow of the method 700 may continue to 710.

At 710, the automatic control system 18 and/or intermediate control system 26 is determined to be in a failure state. Due to the failure of the first control signal 20 to cause the brake system 14 to activate, the automatic control system 18 and/or intermediate control system 26 may not be functioning properly. If the automatic control system 18 and/or intermediate control system 26 is in a failure state, then the method 700 may attempt to activate the brake system 14 using one or more options shown at 712, 714, 716. One or more of these options may be performed.

At 712, the first control signal 20 is re-sent to the first actuation component 16. The first control signal 20 may be communicated from the automatic control system 18 to the first actuation component 16 without communicating the first control signal 20 to or through the intermediate control system 26.

At 714, the first control signal 20 also is sent to the second actuation component 22. For example, the same control signal 20 sent at 710 to activate the brake system 14 also may be sent to the second actuation component 22.

At 716, the second control signal 24 is sent to the second actuation component 22. For example, the first control signal 20 may be used to attempt to activate the first actuation component 16 and a different, second control signal 24 may be sent to the second actuation component 22 to activate the second actuation component 22.

At 718, another determination is made as to whether the brake system 14 was activated. Following one or more of the operations performed in connection with 712, 714, and/or 716, another examination of the braking system 14 may be conducted in order to determine if the brake system 14 was activated. If the brake system 14 was activated, flow of the method 700 may return to 702. If the brake system 14 was not activated, then flow of the method 700 may continue to 720.

At 720, a determination that the first and/or second actuation components 16, 22 are in a failure state is made. For example, after the communication of the first control signal 20 to the intermediate control system 26 and/or the first actuation component 16 was unsuccessful in activating the brake system 14, and after the performance of one or more of the operations described in connection with 712, 714, and/or 716 is unsuccessful in activating the brake system 14, the first and/or second actuation components 16, 22 may be identified as being in a failure state.

At 722, the operator of the vehicle 12 may be directed to activate the braking system 14. For example, a visual and/or audible alarm or alert may be generated to direct the operator to manually actuate the isolation cock 36 and/or manual valve 38 in order to exhaust the fluid from the brake system 14 and activate the brake system 14.

In an embodiment, a vehicle control system includes a brake system onboard a vehicle, a first actuation component, an automatic control system, and a second actuation component. The first actuation component is operably coupled to the brake system and is configured to cause actuation of the brake system to brake the vehicle when the first actuation component is activated. The automatic control system is onboard the vehicle and is configured to generate a first control signal for controlling the first actuation component to activate to upon occurrence of one or more designated conditions. The second actuation component is operably coupled to the brake system and is configured to cause actuation of the brake system to brake the vehicle upon receipt of one of the first control signal or a second control signal generated by the automatic control system.

In one aspect, the vehicle system also includes an intermediate control system operably disposed between the automatic control system and the first actuation component. The intermediate control system is configured to control activation of the first actuation component responsive to receiving the first control signal generated by the automatic control system.

In one aspect, the automatic control system is configured to generate the first control signal responsive to receiving a designated off-board signal from off-board the vehicle.

In one aspect, the second brake actuation component comprises an electrically activated valve operably coupled to a brake pipe of the brake system. The electrically activated valve is operably coupled to a first exhaust so that, when the electrically activated valve is activated upon receipt of the one of the first control signal or the second control signal, a pressure level in the brake pipe is reduced through the electrically activated valve and the first exhaust for actuating the brake system to brake the vehicle.

In one aspect, the vehicle system also includes an isolation cock fluidly coupled with the brake pipe between the electrically activated valve and the first exhaust, wherein, in a first position of the isolation cock. The isolation cock blocks a fluid connection between the electrically activated valve and the first exhaust to prevent a reduction in the pressure level in the brake pipe when the electrically activated valve is activated. In a different, second position of the isolation cock, the isolation cock enables the fluid connection to allow a reduction in the pressure level in the brake pipe when the electrically activated valve is activated.

In one aspect, the electrically activated valve comprises a magnet valve.

In one aspect, the vehicle system also includes a manual valve fluidly coupled to the brake pipe of the air brake system. The manual valve is operably coupled to a second exhaust so that when the manual valve is manually actuated from a closed state to an open state the pressure level in the brake pipe is reduced through the manual valve and the second exhaust for actuating the brake system to brake the vehicle.

In one aspect, the vehicle system also includes a pressure sensor fluidly coupled to a brake pipe of the brake system and operably coupled to the automatic control system. The automatic control system is configured to determine if the second brake actuation component is operational based on an output signal of the pressure sensor.

In one aspect, the second actuation component is configured to activate upon receipt of the second control signal generated by the automatic control system. The automatic control system can be configured to generate the second control signal if the brake system is not actuated to brake the vehicle after a designated time period from when the first control signal was generated for controlling the first brake actuation component to activate.

In one aspect, the second brake actuation component is configured to activate upon receipt of the second control signal generated by the automatic control system. The automatic control system is configured to delay generation of the second signal for a designated time period responsive to the automatic control system being in a failure state.

In an embodiment, a vehicle system includes an air brake system onboard a vehicle, first and second brake actuation components, an automatic control system, and an intermediate control system. The first brake actuation component is operably coupled to the air brake system and is configured, when activated, to cause actuation of the air brake system to brake the vehicle. The second brake actuation component is operably coupled to the air brake system and is configured, when activated, to cause actuation of the air brake system to brake the vehicle. The automatic control system is onboard the vehicle and is configured, upon receipt of a designated off-board signal from off-board the vehicle, to generate a first control signal for controlling the first brake actuation component to activate. The intermediate control system is operably disposed between the automatic control system and the air brake system. The intermediate control system is configured to control activation of the first brake actuation component responsive to receiving the first control signal. The automatic control system is further configured to generate a second control signal for controlling the second brake actuation component to activate if the air brake system is not actuated to brake the vehicle within a designated time period from when the first control signal is generated.

In one aspect, the second brake actuation component comprises an electrically activated valve operably coupled to a brake pipe of the air brake system. The electrically activated valve is operably coupled to a first exhaust so that when the electrically activated valve is activated upon receipt of the second signal a pressure level in the brake pipe is reduced through the electrically activated valve and first exhaust for actuating the air brake system to brake the vehicle.

In one aspect, the vehicle system also includes an isolation cock coupled between the electrically activated valve and the first exhaust. In a first position of the isolation cock, the isolation cock blocks a fluid connection between the electrically activated valve and the first exhaust to prevent a reduction in the pressure level in the brake pipe when the electrically activated valve is activated. In a second position of the isolation cock, the isolation cock enables the fluid connection to allow a reduction in the pressure level in the brake pipe when the electrically activated valve is activated.

In one aspect, the electrically activated valve comprises a magnet valve.

In one aspect, the system also includes a manual valve operably coupled to the brake pipe of the air brake system. The manual valve is operably coupled to a second exhaust so that when the manual valve is manually actuated from a closed state to an open state the pressure level in the brake pipe is reduced through the manual valve and second exhaust for actuating the air brake system to brake the vehicle.

In one aspect, the system includes at least one of a pressure switch or a pressure gauge fluidly coupled to a brake pipe of the air brake system and operably coupled to the automatic control system. The automatic control system is configured to determine if the second brake actuation component is operational based on an output signal of the at least one of the pressure switch or the pressure gauge.

In one aspect, the automatic control system is configured to delay generation of the second signal for a designated time period responsive to the automatic control system being in a failure state.

In an embodiment, a method (e.g., for controlling a brake system of a vehicle) includes coupling a magnet valve to an air brake system of a vehicle that includes a first valve also coupled with the air brake system. Each of the magnet valve and the first valve is configured to be separately control to block or permit flow of air out of the air brake system to activate the air brake system. The method also includes connecting the magnet valve to an automatic control system of the vehicle. The automatic control system is configured to communicate one or more control signals to the first valve and the magnet valve to cause at least one of the first valve and the magnet valve to open and allow the air to flow out of the air brake system to activate the air brake system. The method further includes configuring the automatic control system to communicate a second control signal of the one or more control signals to the magnet valve responsive to the automatic control system previously communicating a first control signal of the one or more control signals to the first valve and the air brake system not being activated. The second control signal is communicated to the magnet valve to open the magnet valve and activate the air brake system.

In one aspect, the method also includes fluidly coupling an isolation cock to the air brake system, the isolation cock configured to be at least one of automatically or manually controlled to block flow of the air out of the air brake system even when the magnet valve is opened by communication of the second control signal from the automatic control signal to the magnet valve.

In one aspect, the first valve is automatically controlled to be opened by an intermediate control system upon receipt of the first control signal by the intermediate control system. The method also may include configuring the automatic control system to also communicate the first control signal to the magnet valve responsive to the air brake system not activating when the first control signal is communicated to the intermediate control system.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the inventive subject matter, and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, controllers or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the presently described inventive subject matter are not intended to be interpreted as excluding the existence of additional embodiments that also incorporate the recited features. Moreover, unless explicitly stated to the contrary, embodiments "comprising," "comprises," "including," "includes," "having," or "has" an element or a plurality of elements having a particular property may include additional such elements not having that property.

What is claimed is:

1. A method comprising:
   coupling a magnet valve to an air brake system of a vehicle that includes a first valve also coupled with the air brake system, each of the magnet valve and the first valve configured to be separately controlled to block or permit flow of air out of the air brake system to activate the air brake system;
   connecting the magnet valve to an automatic control system and an intermediate control system of the vehicle, the automatic control system configured to communicate one or more control signals to the first valve and the magnet valve to cause at least one of the first valve and the magnet valve to open and allow the air to flow out of the air brake system to activate the air brake system, the intermediate control system configured to control when electric energy is supplied to the magnet valve in order to control whether the magnet valve is open or closed;
   configuring the automatic control system to communicate a second control signal of the one or more control signals to the magnet valve responsive to the automatic control system previously communicating a first control signal of the one or more control signals to the first valve and the air brake system not being activated, the second control signal communicated to the magnet valve to open the magnet valve and activate the air brake system; and
   configuring one or more operational guidelines of the intermediate control system to prevent the air brake system from being activated responsive to the automatic control system entering a failure state.

2. The method of claim 1, further comprising fluidly coupling an isolation cock to the air brake system, the isolation cock configured to be at least one of automatically or manually controlled to block flow of the air out of the air brake system even when the magnet valve is opened by communication of the second control signal from the automatic control signal to the magnet valve.

3. The method of claim 1, wherein the first valve is configured to be automatically controlled to be opened responsive to communication of the first control signal, and further comprising configuring the automatic control system to also communicate the first control signal to the magnet valve responsive to the air brake system not activating responsive to communication of the first control signal.

\* \* \* \* \*